US007899867B1

(12) United States Patent
Sherstinsky et al.

(10) Patent No.: US 7,899,867 B1
(45) Date of Patent: *Mar. 1, 2011

(54) SPIM BLOCKING AND USER APPROVAL TECHNIQUES FOR REAL-TIME MESSAGING NETWORKS

(75) Inventors: Alex Sherstinsky, Palo Alto, CA (US); Joseph Petviashvili, Foster City, CA (US); Eric Young, Natick, MA (US); Jonathan Christensen, San Ramon, CA (US)

(73) Assignee: FaceTime Communications, Inc,, Belmont, CA (US)

( * ) Notice: Subject to any disclaimer, the term of this patent is extended or adjusted under 35 U.S.C. 154(b) by 1060 days.

This patent is subject to a terminal disclaimer.

(21) Appl. No.: 11/031,123

(22) Filed: Jan. 7, 2005

Related U.S. Application Data

(63) Continuation-in-part of application No. 10/212,129, filed on Jul. 31, 2002, now Pat. No. 7,596,599.

(60) Provisional application No. 60/606,284, filed on Aug. 31, 2004.

(51) Int. Cl.
*G06F 15/16* (2006.01)
*G06F 17/00* (2006.01)
*G06F 7/04* (2006.01)

(52) U.S. Cl. ......... 709/206; 709/203; 709/232; 709/246; 726/1; 726/2

(58) Field of Classification Search .................. 709/206, 709/204
See application file for complete search history.

(56) References Cited

U.S. PATENT DOCUMENTS

| 5,943,478 | A | 8/1999 | Aggarwal et al. | |
|---|---|---|---|---|
| 5,999,932 | A | 12/1999 | Paul | |
| 6,052,372 | A | 4/2000 | Gittins et al. | |
| 6,199,102 | B1 * | 3/2001 | Cobb | 709/206 |
| 6,212,548 | B1 | 4/2001 | DeSimone et al. | |
| 6,248,946 | B1 | 6/2001 | Dwek | |
| 6,260,148 | B1 | 7/2001 | Aggarwal et al. | |
| 6,292,800 | B1 | 9/2001 | Eldreth | |
| 6,301,609 | B1 | 10/2001 | Aravamudan et al. | |
| 6,308,238 | B1 | 10/2001 | Smith et al. | |
| 6,336,133 | B1 | 1/2002 | Morris et al. | |
| 6,339,784 | B1 | 1/2002 | Morris et al. | |
| 6,366,962 | B1 | 4/2002 | Teibel | |
| 6,389,132 | B1 | 5/2002 | Price | |
| 6,400,381 | B1 | 6/2002 | Barrett et al. | |
| 6,408,066 | B1 | 6/2002 | Andruska et al. | |
| 6,430,602 | B1 * | 8/2002 | Kay et al. | 709/206 |
| 6,449,344 | B1 | 9/2002 | Goldfinger et al. | |
| 6,539,421 | B1 * | 3/2003 | Appelman et al. | 709/206 |

(Continued)

*Primary Examiner* — Kamal B Divecha
(74) *Attorney, Agent, or Firm* — Townsend and Townsend and Crew LLP

(57) ABSTRACT

Techniques for processing instant messages (IM) received from entities destined for IM clients are provided. An IM module is used to receive the instant messages and process them. In one embodiment, the IM module may be used to determine if a message is spam (or spim) or not. The IM module receives an instant message for the IM client and determines if a challenge message should be sent to the sender of the IM. The challenge IM is an IM that is sent to the sender of the IM that necessitates a challenge. If a response to the IM challenge is received at the IM module, it is determined if the response satisfies an answer required by the challenge IM. If the response satisfies the answer, the IM received may be forwarded to the intended recipient IM client. Additionally, a method for processing buddy list events using an IM module is provided.

31 Claims, 8 Drawing Sheets

U.S. PATENT DOCUMENTS

| | | | |
|---|---|---|---|
| 6,546,416 B1 * | 4/2003 | Kirsch | 709/206 |
| 6,549,937 B1 * | 4/2003 | Auerbach et al. | 709/206 |
| 6,609,196 B1 * | 8/2003 | Dickinson et al. | 713/154 |
| 6,654,787 B1 * | 11/2003 | Aronson et al. | 709/206 |
| 6,691,156 B1 * | 2/2004 | Drummond et al. | 709/206 |
| 6,757,830 B1 * | 6/2004 | Tarbotton et al. | 713/188 |
| 6,868,498 B1 * | 3/2005 | Katsikas | 726/14 |
| 6,965,920 B2 * | 11/2005 | Pedersen | 709/206 |
| 6,976,092 B1 * | 12/2005 | Daniell et al. | 709/246 |
| 7,016,978 B2 * | 3/2006 | Malik et al. | 709/246 |
| 7,035,942 B2 * | 4/2006 | Daniell et al. | 709/246 |
| 7,039,949 B2 * | 5/2006 | Cartmell et al. | 726/6 |
| 7,123,706 B2 * | 10/2006 | Ooki | 379/211.02 |
| 7,127,741 B2 * | 10/2006 | Bandini et al. | 726/14 |
| 7,171,190 B2 * | 1/2007 | Ye et al. | 455/412.1 |
| 7,194,516 B2 * | 3/2007 | Giacobbe et al. | 709/206 |
| 7,203,749 B2 * | 4/2007 | Hiraga | 709/224 |
| 7,209,957 B2 * | 4/2007 | Patron et al. | 709/208 |
| 7,237,008 B1 * | 6/2007 | Tarbotton et al. | 709/206 |
| 7,263,545 B2 * | 8/2007 | Digate et al. | 709/206 |
| 7,277,719 B2 * | 10/2007 | Klassen et al. | 455/466 |
| 7,310,659 B1 * | 12/2007 | George | 709/206 |
| 7,321,969 B2 * | 1/2008 | Schoen et al. | 713/153 |
| 7,324,826 B2 * | 1/2008 | Carey et al. | 455/466 |
| 7,346,696 B2 * | 3/2008 | Malik | 709/229 |
| 7,373,383 B2 * | 5/2008 | Boss et al. | 709/206 |
| 7,380,274 B2 * | 5/2008 | Dickinson et al. | 726/14 |
| 7,401,356 B2 * | 7/2008 | Bandini et al. | 726/14 |
| 7,441,262 B2 * | 10/2008 | Hui et al. | 726/1 |
| 7,461,378 B2 * | 12/2008 | Beyda | 719/313 |
| 7,596,599 B1 * | 9/2009 | Maghsoodnia et al. | 709/206 |
| 7,603,467 B2 * | 10/2009 | Malik et al. | 709/227 |
| 7,620,408 B2 * | 11/2009 | Ye et al. | 455/466 |
| 2002/0116463 A1 * | 8/2002 | Hart | 709/206 |
| 2002/0120600 A1 * | 8/2002 | Schiavone et al. | 707/1 |
| 2003/0023736 A1 * | 1/2003 | Abkemeier | 709/229 |
| 2003/0028597 A1 * | 2/2003 | Salmi et al. | 709/204 |
| 2003/0125927 A1 | 7/2003 | Seme | |
| 2003/0233418 A1 * | 12/2003 | Goldman | 709/206 |
| 2004/0015554 A1 * | 1/2004 | Wilson | 709/206 |
| 2004/0088423 A1 | 5/2004 | Miller et al. | |
| 2004/0103318 A1 | 5/2004 | Miller et al. | |
| 2004/0109518 A1 | 6/2004 | Miller et al. | |
| 2004/0111623 A1 | 6/2004 | Miller et al. | |
| 2004/0136386 A1 | 7/2004 | Miller et al. | |
| 2004/0143632 A1 * | 7/2004 | McCarty | 709/206 |
| 2004/0143633 A1 * | 7/2004 | McCarty | 709/206 |
| 2004/0158610 A1 * | 8/2004 | Davis et al. | 709/206 |
| 2004/0193722 A1 * | 9/2004 | Donovan | 709/230 |
| 2005/0055412 A1 * | 3/2005 | Kaminsky et al. | 709/207 |
| 2005/0055416 A1 * | 3/2005 | Heikes et al. | 709/207 |
| 2005/0187781 A1 * | 8/2005 | Christensen | 705/1 |
| 2006/0095511 A1 * | 5/2006 | Munarriz et al. | 709/203 |
| 2007/0214001 A1 * | 9/2007 | Patron et al. | 705/1 |
| 2009/0125591 A1 * | 5/2009 | Kirkpatrick | 709/206 |
| 2009/0313345 A1 * | 12/2009 | Dollar et al. | 709/206 |

\* cited by examiner

SPIM BLOCKING AND USER APPROVAL TECHNIQUES FOR REAL-TIME MESSAGING NETWORKS

CROSS-REFERENCES TO RELATED APPLICATIONS

This application is a continuation-in-part of U.S. application Ser. No. 10/212,129, entitled MANAGEMENT CAPABILITIES FOR REAL-TIME MESSAGING NETWORKS, filed on Jul. 31, 2002, which is herein incorporated by reference in its entirety for all purposes.

This application claims priority from co-pending U.S. Provisional Patent Application No. 60/606,284, filed Aug. 31, 2004 entitled APPARATUS AND METHODS FOR PROCESSING INSTANT MESSAGES which is hereby incorporated by reference, as if set forth in full in this document, for all purposes.

BACKGROUND OF THE INVENTION

The present invention generally relates to telecommunications and more specifically to a system and method for managing instant message communications.

With the advent of the Internet, users have been provided with a faster electronic means of communicating with each other. For example, instant messaging allows users to interact in real-time communications through networks such as the Internet.

Unfortunately, with the advent of new communication methods associated with the Internet, spam has proliferated with the ease of use of these new methods of communication. Spam on IM networks is the unauthorized sending of messages to an instant message screen name. When a spam message is sent to an IM screen name, an IM window is created on a user's screen as a pop-up window. The pop-up window typically includes the message from the spammer, such as any objectionable content, an advertisement, etc. The pop-up window cannot be avoided as it takes up visible (and valuable) screen real estate. A user typically has to respond to the pop-up window by minimizing it, closing it, or responding to the spammer. Unlike email, which allows a user to deal with the spam at another time, the user is interrupted when IM spam is received. A popular new shorthand for IM spam is "spIM" (or "spim", or SpIM, etc.).

IM clients allow a user to block anyone not on their "buddy list" from contacting them. A buddy list may be any list of contacts. This effectively eliminates spam in that people not on the user's buddy list cannot contact the user. Blocking all users not on their buddy list, however, imposes a big limitation on an IM user. For example, friends of the user cannot contact the user without first being on the user's buddy list. Additionally, acquaintances or people that user may want to receive an IM from cannot IM with the user until the user puts them on his or her buddy list.

BRIEF SUMMARY OF THE INVENTION

In one embodiment, a method of processing instant messages (IM) received from entities destined for IM clients is provided. An IM module is used to receive the instant messages and process them. In one embodiment, the IM module may be used to determine if a message is spam or not. The IM module receives an instant message for the IM client and determines if a challenge message should be sent to the sender of the IM. The challenge IM is an IM that is sent to the sender of the IM that necessitates (or prompts, or warrants, etc.) a challenge. A challenge may be a question or any other statement that requires a response to a challenge. If a response to the IM challenge is received at the IM module, it is determined if the response satisfies an answer required by the challenge IM. If the response satisfies the answer, the IM received may be forwarded to the IM client. If the response does not satisfy the answer, it may be classified as spam and not forwarded to the IM client. Also, if no response is received, the IM may be considered spam and the IM not be forwarded to the user. Thus, by declining a response to a challenge IM, the incoming IM may be classified as spam.

In one embodiment, a method for processing instant messages (IMs) from entities destined for IM clients using an IM module is provided. The method comprises: receiving an IM destined for an IM client at the IM module; determining if a challenge IM should be sent to a sender of the IM; if a challenge IM should be sent, sending a challenge IM to sender of the IM, the challenge message requiring a response from the sender; and if an IM response to the challenge IM is received at the IM module, determining if the response satisfies an answer required by the challenge IM; and forwarding the received IM to the IM client if the response satisfies the response required by the challenge IM.

In another embodiment, a method for managing IMs from entities for one or more IM clients using an IM module is provided. The method comprises: determining a contact list for the one or more IM clients, the contact list including a list of identifiers; receiving an IM destined for an IM client in the one or more IM clients at the IM module; determining an identifier for the received IM; determining a contact list for the IM client, the contact list including one or more identifiers that may be associated with IMs; determining whether the determined identifier matches an identifier in the one or more identifiers; if the determined identifier does not match an identifier in the one or more identifiers, sending a challenge IM to an entity that sent the IM, the challenge message requiring a response from the entity; and if the determined identifier does match an identifier in the one or more identifiers, forwarding the received IM to the IM client.

In yet another embodiment, a method for processing instant messages (IMs) from entities destined for IM clients using an IM module is provided. The method comprises: receiving an IM destined for an IM client at the IM module; determining if a challenge IM should be sent to a sender of the IM; if a challenge IM should be sent, sending a challenge IM to sender of the IM, the challenge message requiring a response from the sender; and if an IM response to the challenge IM is received at the IM module, determining if the response satisfies an answer required by the challenge IM; and forwarding the received IM to the IM client if the response satisfies the response required by the challenge IM.

A further understanding of the nature and advantages of the invention herein may be realized by reference of the remaining portions in the specifications and the attached drawings.

DETAILED DESCRIPTION OF THE INVENTION

Figure 1:
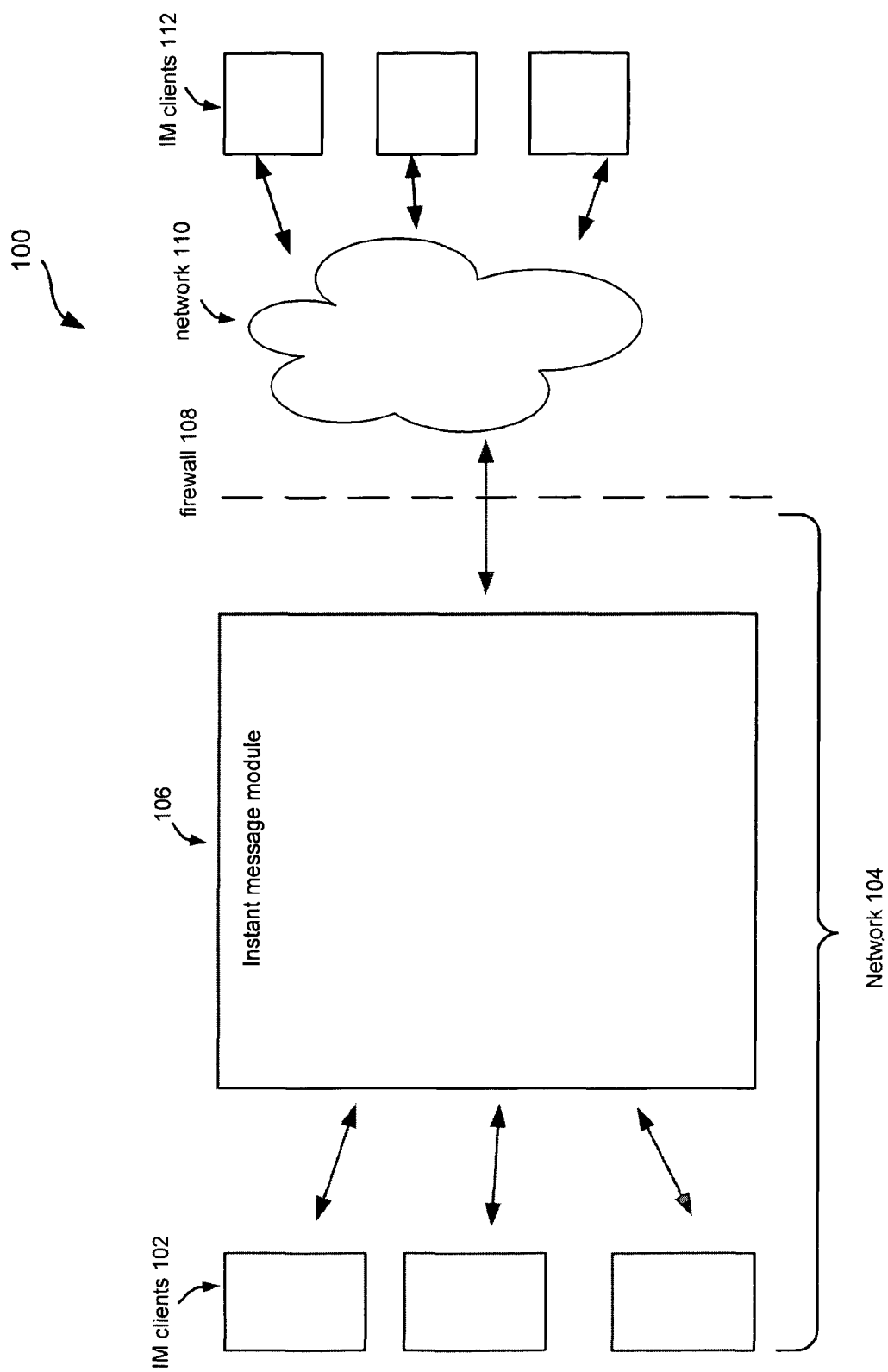
FIG. 1 depicts a system for processing instant messages according to one embodiment of the present invention.

FIG. 1 illustrates an instant message system 100 for processing instant messages according to one embodiment of the present invention. As shown, system 100 includes a plurality of instant message (IM) clients 102, a network 104, an instant message module 106, a firewall 108, a network 110, and a plurality of instant message clients 112 according to one embodiment.

IM clients 102 are used to send and receive instant message communications with other IM clients. IM clients may be installed on any computing device, such as a personal computer (PC), pocket PC, personal digital assistant (PDA), RIM blackberry device, telephone, cellular phone, pager, etc.

In one embodiment, IM clients 102 may send IM communications that include textual messages. Also, IM communications may be sent that signal configuration and/or control information, or indicate actions to be taken by an IM client 102. For example, IM communications include on-line and off-line indications for users, alerts, communications for sending files, voice, video, etc. For purposes herein, IM communications include any communications made for the purpose of instant messaging.

In one embodiment, IM clients 102 are IM clients of any network implementation. For example, the network implementations may include MSN, AIM, Yahoo!, ICQ, SMS, IBM/Lotus Sametime, Microsoft Exchange 2000, Microsoft RTC, Reuters Messaging, Bloomberg, and the like. In one embodiment, IM clients 102 of a particular network implementation communicate with each other through an IM network for the network implementation. An IM network is any network that is configured to allow instant messaging for a particular network implementation.

Network 104 is any network that can support instant messaging. For example, network 104 includes an enterprise local area network, an extranet, etc. In one embodiment, network 104 forms an enterprise network that is defined by firewall 108. In this embodiment, any devices behind firewall 108 are considered part of the enterprise network and other devices outside of firewall 108 are considered to be outside of the enterprise network. Accordingly, IM clients 102 and IM module 106 are considered part of the enterprise network. Although firewall 108 is shown, it will be understood that firewall 108 may not be included in system 100.

Network 110 is any network that is configured to support instant messaging and other communications. In one embodiment, network 110 is a public IM network for a particular network implementation (e.g. AIM, MSN, Yahoo!). For discussion purposes, network 110 includes any IM network located outside of firewall 108. For example, network 110 may be a public IM network (AIM, MSN, Yahoo), running on top of the Internet, or in some cases a proprietary IM network, running over an extranet (e.g., a VPN built on top of the Internet). Network 110 thus can include an AOL commercial IM network, an MSN commercial IM network, a Yahoo! commercial IM network, etc.

IM clients 112 are connected to network 110. IM clients 112 may include similar characteristics as described with regard to IM clients 102. However, in relation to firewall 108, IM clients 112 are located outside of network 104. While IM clients 112 may be located on their own enterprise network, for discussion purposes, IM clients 112 are considered public IM clients that may communicate with IM clients 102.

In one embodiment, instant message (IM) module 106 is configured to receive and forward instant message communications. The functionality of embodiments of IM module 106, and other devices described, may be implemented by software, hardware, or any combination thereof. In one embodiment, IM module 106 is a computing device, such as a server, PC, workstation, network computer, mainframe, and the like. In another embodiment, IM module 106 is a software module or plug-in.

In one embodiment, IM module 106 may receive and forward instant message communications using different models. For example, a proxy model, a server model, an event model, or any combination thereof may be used and will be described in more detail below. Although only these models are described, it will be understood that a person skilled in the art will appreciate other models that may be used to receive and forward messages at IM module 106.

IM module 106 receives instant message communications associated with IM clients 102 of various network implementations. Thus, no matter what the network implementation of each IM client 102, IM module 106 can receive and process instant message communications sent for or from IM clients 102.

Once IM module 106 receives instant message communications from IM clients 102, IM module 106 is configured to determine a policy that is applicable for that instant message communication. The policies include actions that IM module 106 may take based on the instant message communication. After determining an applicable policy, IM module 106 performs the action associated with the policy for the instant message communication. Examples of actions that may be taken include recording the instant message communication, modifying the instant message communication, blocking the instant message communication, forwarding the instant message communication. Additional actions will be described below and it will be understood that the actions are not limited to these actions and a person skilled in the art will appreciate other actions that may be taken.

Figure 2:
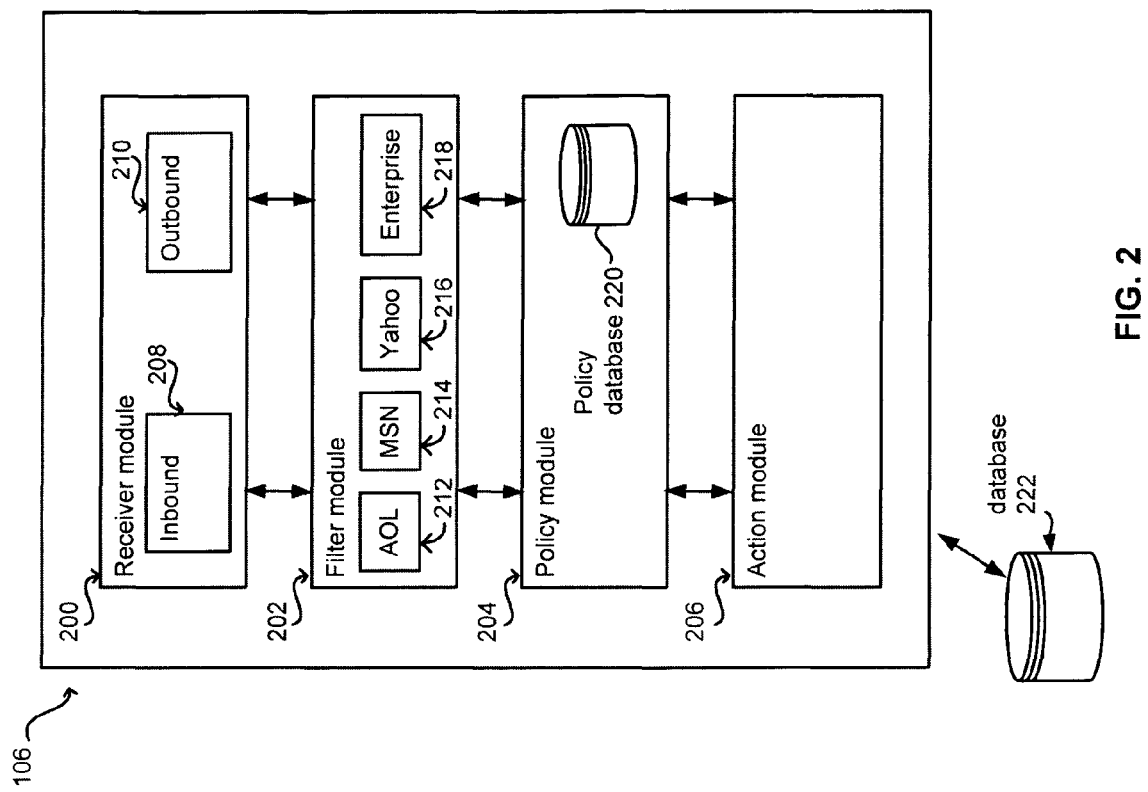
FIG. 2 illustrates an embodiment of an instant message module.

FIG. 2 illustrates an embodiment of IM module 106. IM module 106 includes a transceiver module 200, a filter module 202, a policy module 204, and an action module 206.

Transceiver module 200 is configured to receive and transmit (hence the name "transceiver", denoting the combination of "transmitter" and "receiver") instant message communications from IM clients 102 and IM clients 112. In one embodiment, transceiver module 200 includes an inbound transceiver module 208 and an outbound transceiver module 210. The inbound transceiver module 208 handles instant messaging communications on behalf of IM clients 102, and outbound transceiver module 210 handles outbound instant message communications on behalf of IM clients 112. For example, inbound transceiver module 208 receives instant message communications from IM clients 102 or sends IM communications to IM clients 102. Also, outbound transceiver module 210 receives IM communications from IM clients 112 or sends an IM communications to IM clients 112.

In one embodiment, transceiver module 200 receives instant message communications through different models, such as the proxy model, server model, and event model. Although only the above models are described below, a person skilled in the art will appreciate other models that may be used to receive messages at IM module 106.

When transceiver module 200 receives an instant message communication, transceiver module 200 sends the instant message communication to filter module 202. Filter module 202 is configured to then filter the instant message communication based on its network implementation. In one embodiment, filter module 202 includes one or more filters for the various network implementations. For example, an AOL filter 212, an MSN filter 214, a Yahoo! filter 216, and an enterprise filter 218 may be included in filter module 202. Although only these filters are shown in FIG. 2, it will be understood that other filters may be included in filter module 202. Each filter in filter module 202 filters instant message communications of a corresponding network implementation. Thus, AOL filter 212 filters instant message communications of an AOL network implementation, MSN filter 214 filters instant communications of a MSN network implementation, and so on.

In filtering the messages, filter module 202 converts an instant message communication received in the network implementation into an IM module format readable by policy module 204. For example, the instant message communications of different network implementations include different protocols. Filter module 202 filters the network implementation specific protocols for the IM communications and converts the IM communications to the IM module format. In one embodiment, the IM module format is a generic format. For example, the network implementation protocols may be removed in the generic format. Accordingly, an AOL instant message communication that is filtered by AOL filter 212 will be filtered into the IM module format, an MSN instant message communication will be filtered by MSN filter 214 into the IM module format, and so on.

Policy module 204 accesses a number of policies that include actions for instant message communications. In one embodiment, a policy database 220 stores the policies. As shown, policy database 220 is located in policy module 204; however, it will be understood that policy database 220 may be located anywhere in IM module 106 or be separate from IM module 106.

The policies in policy database 220 include actions that can be taken by instant message module 106. The policies may be applied to a certain instant message communication or multiple IM communications. Policy module 204 determines from characteristics related to the instant message communication whether any policies in policy database 220 apply to the IM communication. For example, policy module 204 may be configured to apply a disclaimer policy to all instant message communications that are received. Thus, when an instant message communication for a certain user is received, policy module 204 determines that the disclaimer policy applies to the instant message communication. In another example, the disclaimer policy may be applicable to IM communications for a user (or a group of users) in which case policy module 204 will determine that the disclaimer policy applies to IM communications for the user (or a group of users) when received. In another example, file transfers from IM clients 112 are scanned by a virus-checking program, while file transfers among IM clients 102 may not be scanned for viruses. In another example, certain groups of users are restricted from performing file transfers. In another example, certain IM content is detected, causing automatic prohibition of that message's transmission and/or an alert (via IM, email, etc.) sent to an administrator.

Once a policy is determined by policy module 204, action module 206 is configured to perform the action corresponding to the determined policy. For example, action module 206 may add a disclaimer to the instant message. Additionally, action module 206 may take one or more action(s) including but not limited to: storing the instant message, modifying the instant message, blocking the instant message, and forwarding the instant message, etc. Once the action is taken, the instant message communication is sent back to transceiver module 200, which may send the instant message to the applicable IM client assuming that the IM message was not blocked by action module 206. If the message is blocked, IM module 106 will not forward the instant message communication.

A database 222 may be used to store information usable for instant message module 106. Database 222 may be included in instant message module 106 or be separate from instant message module 106. In one embodiment, database 222 includes one or more information items including but not limited to: client identifications for IM clients 102, mapping information for IM clients 102, and policies that may be implemented by policy module 204. This information is used by modules in IM module 106 for any purpose.

As mentioned above, IM module 106 may be implemented in a proxy server model, a server model, an event model, or any combination thereof. In the proxy server model, IM module 106 is situated in network 104 and acts as a proxy server between IM clients 102 and network 110. IM module 106 supports any kind of enterprise proxy protocols, such as SOCKS, HTTP, HTTPS.

In the proxy server model, IM module 106 intercepts IM communications. In one example, IM clients 102 connect to IM module 106 by specifying IM module's 106 host and port in the proxy settings of IM clients 102. IM module 106 then connects to network 110 on behalf of IM clients 102. IM module 106 then connects to other IM clients (e.g., other IM clients 102 and/or network 110 in order to reach IM clients 112) for an IM client 102.

Referring to FIG. 1, in the proxy server model, a request is received by IM module 106. IM module 106 thus intercepts and processes the received IM communications, and then sends the response to network 110 or network 104 via SOCKS, or HTTP, or HTTPS (if necessary), or directly to network 110 or network 104.

In the server model, IM module 106 does not appear as a proxy for IM clients 102. Instead, IM clients 102 connect to IM module 106 in a client-to-server fashion. For example, IM clients 102 may connect using a protocol that is specially defined for use between the given IM client 102 and IM module 106.

In the event model, IM module 106 interacts with another IM server, such as an enterprise IM server that is deployed on network 104. The enterprise IM server is responsible for sending events to IM module 106. The events indicate that something related to instant messaging has taken place in the enterprise IM server (e.g., an IM client signed on/off; an IM client sent a text message to another IM client; an IM client has joined/left a chat room; the presence status of an IM client has changed; or the geographical location of an IM client has changed). Once receiving the event, IM module 106 may access the enterprise IM server through an interface (typically an application programmer's interface, or API for short) that allows IM module 106 to gain control of enterprise IM server functions. IM module 106 thus receives events encapsulating various details concerning instant message communications. If IM module 106 determines an action should be taken, IM module 106 can take the action by controlling the IM server through the API.

For example, an IM communication may be sent by the enterprise IM client 102 to the enterprise IM server. Upon receiving the IM communication, the enterprise IM server sends the corresponding event to IM module 106. IM module 106 intercepts the event, which includes the IM communication, and may then process the intercepted IM communication according to any applicable policies.

Figure 3:
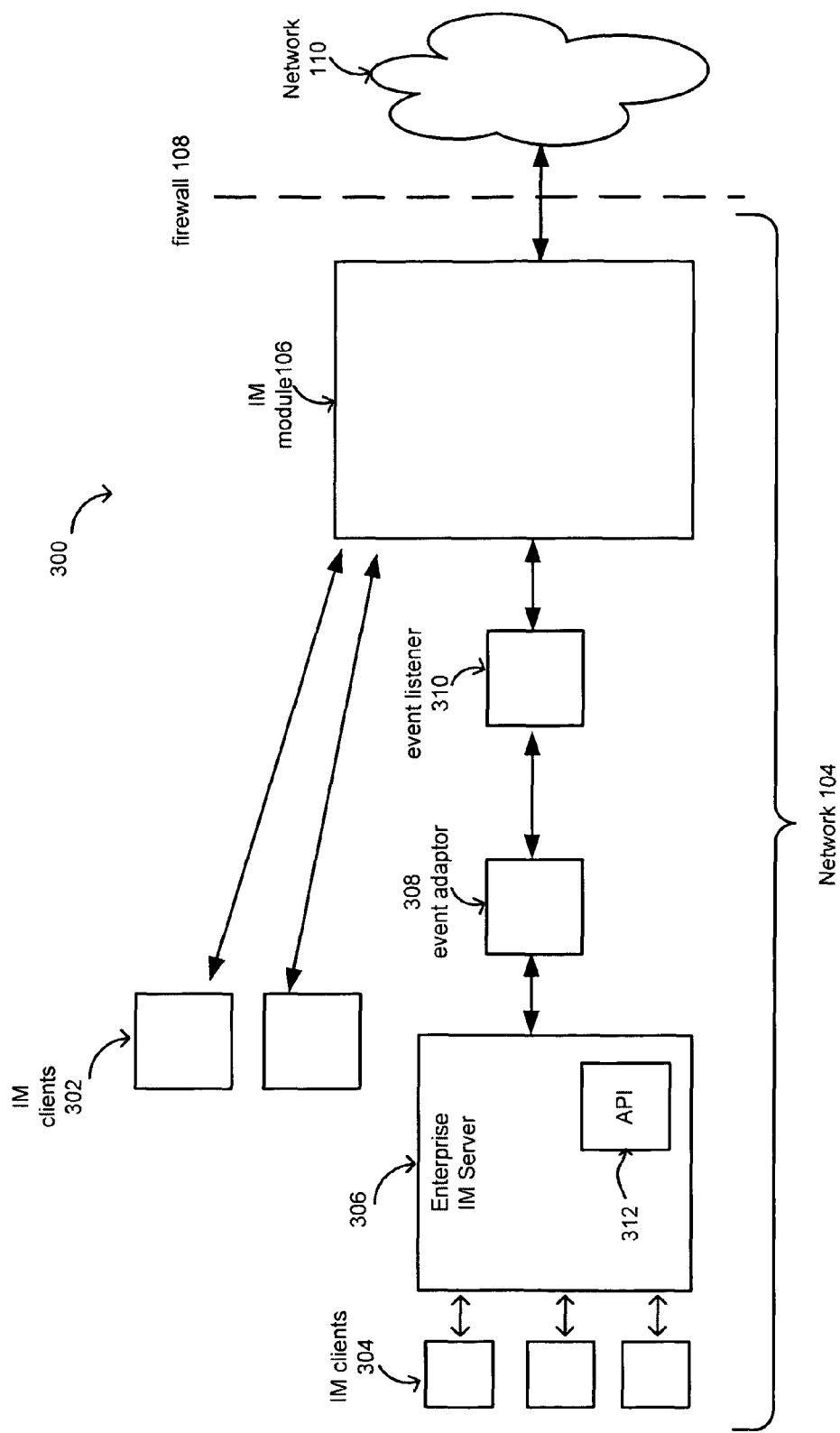
FIG. 3 illustrates an embodiment of an instant message system.

FIG. 3 illustrates one embodiment of an instant message system 300. This embodiment includes public IM clients 302 for one or more public IM network implementations and private IM clients 304 for one or more private IM network implementations.

As shown, FIG. 3 includes an enterprise IM server 306, an event adapter 308 and an event listener 310. Enterprise IM server 306 handles IM communications for enterprise clients 304. Enterprise IM server 306 also includes an API 312 that allows IM module 106 to access functions and controls of enterprise IM server 306.

When enterprise IM server 306 receives an IM communication, enterprise IM server 306 sends an indication through event adapter 308 to indicate that an event has occurred. Event listener 310 receives the indication and alerts IM module 106 of the event. IM module 106 then connects to enterprise IM server 306 through API 312 to intercept and receive the IM communication. IM module 106 then can process the IM communication as described above.

IM module 106 may also be configured in the proxy server model or server model for public IM clients 302. Public IM clients 302 connect to IM module 106 through methods described above, which allows IM module 106 to intercept IM communications to and from IM clients 302. IM module 106 also forwards the IM communications to and from IM clients 302 and connects to network 110 on behalf of IM clients 302.

Figure 4:
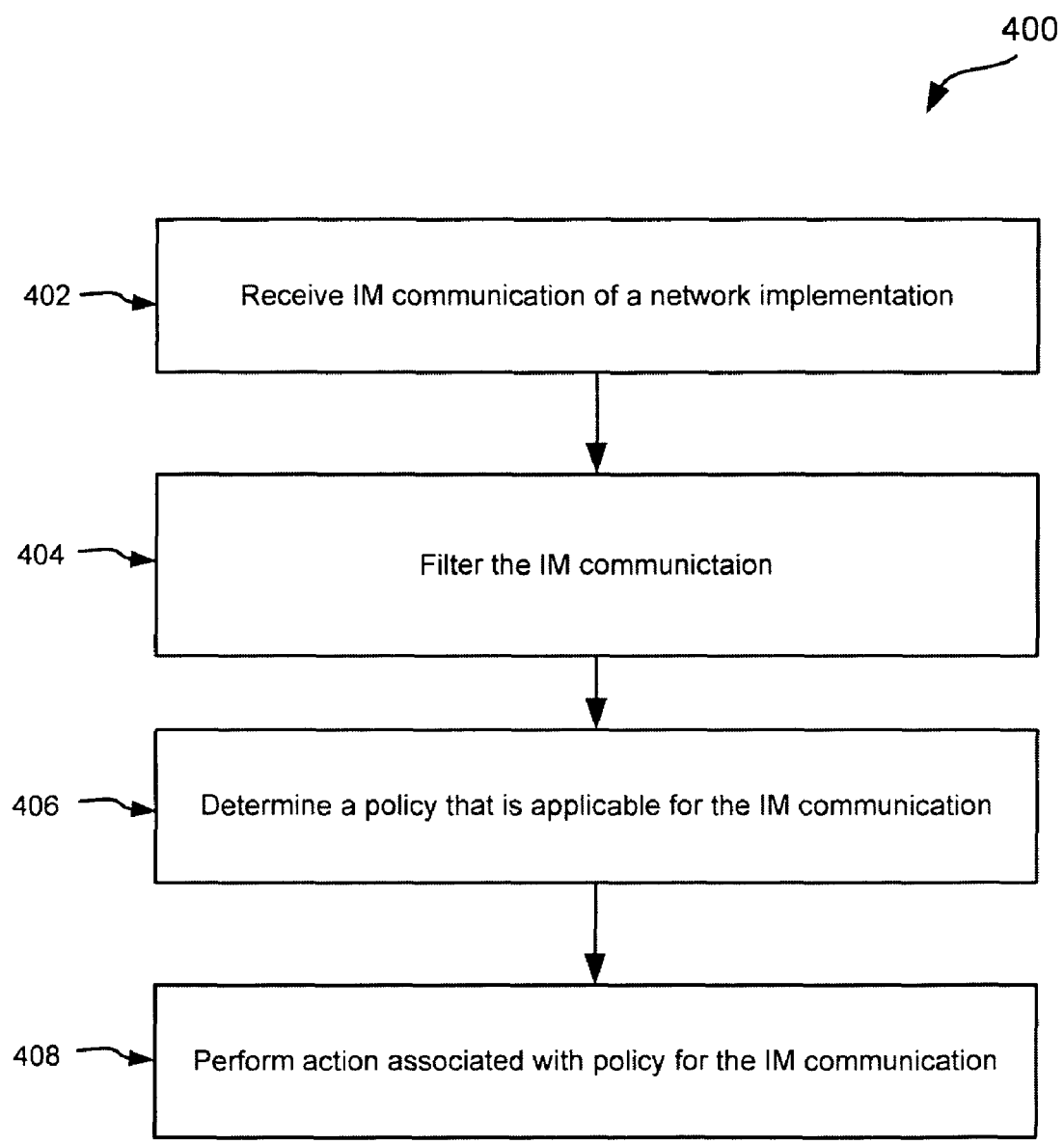
FIG. 4 depicts a simplified flow chart of a method for managing instant message communications according to one embodiment of the present invention.

FIG. 4 depicts a simplified flow chart 400 of a method for managing instant message communications according to one embodiment of the present invention. In step 402, IM module 106 receives an instant message communication of a network implementation. As mentioned above, the IM communications may be in any network implementation. In one embodiment, IM module 106 may receive the IM communication through the proxy, event, and/or server models.

In step 404, IM module 106 filters the IM communication in the network implementation into an IM module format. As mentioned above, the IM module format may be a generic format. In one embodiment, protocols that are associated with each of the network implementations are filtered from the IM communications. For example, AOL IM communications are filtered through AOL filter 212, MSN IM communications are filtered through MSN filter 214, and so on.

In step 406, IM module 106 determines a policy from a group of policies that is applicable for the IM communication in the IM module format. In one embodiment, policies are stored in policy database 220 and appropriate policies are retrieved based on characteristics of the IM communication. Also, IM module 106 may retrieve multiple policies for the IM communication.

Once one or more policies are determined to be applicable to the IM communication, in step 408, IM module 106 performs an action associated with the applicable policy for the IM communication. As discussed above, various actions, such as recording portions of the IM communication, modifying the IM communication, blocking the IM communication, and forwarding the IM communication, may be taken by IM module 106.

Embodiments of actions and implementations for IM module 106 will now be described. In one embodiment, IM module 106 may be used as an auditor for an enterprise. Some enterprises may be subjected to regulation and auditing of all conversations among employees, and between employees and outsiders. Thus, even instant message communications by employees are recorded.

IM module 106 may be configured to manage instant message communications of enterprise employees using IM clients 102 and perform the action of recording the content of all IM communications. Accordingly, the enterprise will be in compliance with regulations for recordings of all conversations with regard to instant messages.

IM module 106 may also be configured to store and reproduce any or all IM communications involving employees using IM clients 102 in their entirety. Additionally, reports showing the IM communications and when they occurred may also be produced.

Also, IM module 106 may be used to produce comprehensive reports on employee's usage of IM clients 102. In this case, IM module 106 will perform the action of storing all IM communications from IM clients 102 of different network implementations. Thus, no matter what network implementation of an IM client 102 is used, IM module 106 is able to record the employee's IM usage. The enterprise can thus monitor employee IM usage and its affect on employee productivity.

In another embodiment, IM module 106 may be used in securing an enterprise network. For example, IM module 106 may monitor IM communications to and from IM clients 102 and perform the action of a virus check or a check for other potential hazards associated with IM communications.

Also, IM module 106 may monitor IM communications for spam. In this case, IM module 106 processes IM communications to determine whether some IM communications are spam. If spam is detected, the IM communications are then flagged, blocked, or sent to a spam message folder. Other actions can be taken as well, e.g., alerting the administrator.

Moreover, IM module 106 may provide access control for network 104. For example, IM module 106 may impose control of principal communication features, such as sign-on privileges, internal enterprise routing or external routing, alerts, file transfers, chatting, and news/stock tickers, for each user using IM clients 102. In one example, IM module 106 may receive an IM communication from an IM client 102 with a request for logging onto an IM network. IM module 106 will then determine the sign-on privileges for the user and determine whether the user should be allowed to sign onto the IM network. IM module 106 will then perform the action of allowing the user to sign-on or blocking the user from signing on.

In another embodiment, IM module 106 may be used to map network identities, also known as buddy names or screen names, to corporate identities of the users of IM clients 102. A user may have a corporate identity that is used for other enterprise applications, such as email. In this example, an instant message communication may be received for a user that is associated with the user's network identity. IM module 106 will include a policy that will map the IM network identity to the corporate identity for the user. Thus, corporate identities may be mapped to identities used in commercial IM networks, allowing IT administrators to have a consistent view of how employees use the company's LAN (consistent in that a view includes all of a user's IM IDs associated with their assigned and recognized corporate ID). Otherwise, the administrator would have to track each network identity on public IM networks.

Also, the corporate identity may be mapped to a group of users. Thus, one identity may be mapped to multiple users' identities. IM module 106 may be used as a foundational platform for building other applications. For example, an automated call distribution (ACD) contact center application server may be implemented in an enterprise network to receive IM communications for the enterprise through a "universal-representative" identification. Because IM module 106 can map network identifications to corporate identifications, the universal-representative identification associated with the ACD server may be assigned to receive IM communications as a concentrator for the entire organization. This universal-representative (or universal-agent) identification may be thought of as a "1-800" telephone number that outside users can use. Thus, outside users contact the ACD server through the universal-agent identification, but internally agents are selected according to their corporate identifications and business policies.

Thus, a help desk identity may be established where an IM communication is sent to the help desk identity and then IM module 106 maps the help desk identity to multiple users that are working on the help desk and sends the instant message communication to all the help desk users of IM clients 102. The users may then choose to help the patrons to answer the question that was sent to the help desk identity.

In another variation, IM module 106 may use sequential routing for the group of enterprise users (in this example, help desk agents), where IM module 106 contacts each user of a group in a pre-determined order until a user responds. IM module 106 then connects the responding user to the customer and they can exchange instant messages. Also, a broadcast routing may be implemented by IM module 106 where all members of a group are contacted at once and the user responds as soon as selected and connected for communicating with a customer.

IM message module 106 then receives the IM communication through the universal identification and can map the universal identification to another user using any IM client 102. The mapping for the universal identification is implemented according to a policy and an action maps the universal identification to other identifications. In one example, depending on who is assigned to a help desk, IM module 106 can map the IM communication for the universal-representative identification to specific identifications for the help desk. Additionally, polices may be set up to map the universal-agent identification to specific users depending on the hours of the day and when the users both are scheduled to work.

In another embodiment, IM module 106 performs the action of managing presence for users. IM module 106 receives presence and availability information (in some cases location information as well) that is associated with the user's network identity in IM communications. An identity with presence, availability, and other auxiliary information associated with it may be referred to as a "presentity" (i.e., "identity with presence"). The presentity may become a group presentity when multiple users' identities with presence information are mapped to a (virtual) group identity. In one embodiment, the presence status of an IM client may indicate that the IM client is on-line, off-line, busy, unavailable, on a mobile device, or other status-related information. Moreover, the presence status may include geographic location information.

IM module 106 may receive IM communications indicating the presence status of IM clients 102 on network 104, IM clients 112 on network 110, and IM clients 304 on network 306. IM module 106 may provide and utilize an API to manage individual presentities and group presentities. The presence API makes generic the presence information obtained in received IM communications containing the presence status of individual users and groups of users. IM module 106 may also encapsulate the management of individual and group presentities for various commercial and enterprise networks in a dedicated component, such as "an IM Gateway" or "an IM Bridge".

Policies may be used by IM module 106 where presentities (i.e., individual and groups of IM clients 102 on network 104, IM clients 112 on network 110, and IM clients 304 on network 306) are managed. For example, IM module 106 may receive an IM communication indicating a change in the presence status of IM client 102, such as going from on-line status to off-line status. Depending on a policy applicable for that IM client 102, IM module 106 takes an action. In one example, an action may include connecting a first IM client trying to communicate with a second IM client with a different user of a third IM client because the second IM client presence status indicates the user is off-line, while the third IM client presence status indicates the user is on-line (i.e., the third user is present and available). For the ACD scenario described above, this could be interpreted as connecting the outside user to an available internal agent, such as the assistant of the agent who became unavailable. Another type of action, based on a change in the presence status of a single IM client 102, may include changing the status of a group presentity. For example, identities of IM clients 102 may be mapped to a help desk identity (which is a group of agents). When IM communications indicating the status change of one or more of the presentities of IM clients 102 are received, IM module 106 may take an action for the help desk group presentity based on a policy. If the presence status for an IM client 102 is on-line, then IM module 106 may make the presence status of the help desk presentity to be on-line. Accordingly, presence may be mapped between an identity for an IM client 102 and other identities. Moreover, presence may be mapped across multiple IM clients 102 of different network implementations.

A session is defined as the information associated with a client connected to a server. For example, a telephone connected to a call center is in session, until one side or the other hangs up. When two clients engage in a live conversation (voice, text, etc.), this is called an interaction. In the case of instant messaging, a session starts when the client signs on. During that time, the client may engage in interactions with other clients (that is, conversations containing one or more messages exchanged among the parties), receive alerts, change availability status, and so on. The session ends when the client signs off. Individual clients are presentities, and groups of clients are group presentities.

Individual and group identities can possess profiles consisting of other attributes, besides presence information. These profile attributes can be manipulated and policies applied to them as part of applications built on top of IM module 106 as a foundational platform. In some applications, it may be advantageous to specify a type of a client by a designated attribute (its values denoting an IM client, an email client, and so on). Since IM module 106 treats presentities, sessions, and interactions generically (possibly accessible via an API), it is possible to develop applications (such as the ACD system described above) that manage communications, flowing across these diverse media channels, in a unified way. In other words, text messaging, email, voice-over-IP (VoIP), and video are just different types of interaction media. While the media have differences (real-time or delayed-response, full-duplex or one-way, specific device types required, etc.), they can be managed uniformly (clients connect and disconnect, interactions start and stop, data flows across) for the identities involved.

In another embodiment, IM module 106 may take the action of providing an IM alert. In this embodiment, IM module 106 receives an IM communication that indicates IM module 106 should send an alert to a particular IM client 102 or a group of IM clients 102. Once receiving the indication, IM module 106 sends an instant message as a reminder for users of particular IM clients 102. For example, if a meeting is scheduled at 11:00 a.m., IM module 106 may receive an IM communication indicating IM module 106 should perform the action of sending an instant message to IM clients 102 that are participating in the meeting.

In another embodiment, IM module 106 performs the actions of implementing various business policies to IM communications. For example, IM module 106 then performs the action of examining messages as they travel between IM clients for objectionable content and other violations. In another example, IM module 106 may receive the IM communication, examine the communication for keywords that have been deemed objectionable and flag the IM communication if the keywords are found.

In another embodiment, IM module 106 may prevent IM communications from being sent and/or reaching their intended IM clients. In this case, IM module 106 may determine from the IM communication that IM communications to the recipient are not allowed. IM module 106 will then block the IM communication.

In another embodiment, IM module 106 may allow employees connected to the enterprise network to share files or block employees' IM clients 102 from sharing files with outside IM networks 110. For example, IM module 106 may enforce a policy for internal routing, where IM module 106 allows IM communications between employees behind the enterprise firewall. If an IM communication is for an external IM client 112, IM module 106 may block the IM communication. This is useful for intellectual property protection, among other benefits.

In another embodiment, the action of adding a disclaimer to an instant message communication may be taken. For example, a disclaimer may be added periodically or when an IM client starts interacting with another IM client for the first time.

Accordingly, IM module 106 uses its position in between an enterprise firewall and IM clients 102 used by employees of the enterprise to manage IM communications to and from the IM clients. IM module 106 receives IM communications for the enterprise and processes the communications according to policies implemented by the enterprise. Actions are then taken by IM module 106 according to the policies. An enterprise using IM module 106 can thus manage all IM communications no matter what the network implementation of the IM communications, because IM module 106 is situated to receive all IM communications.

In one embodiment, methods and apparatus for processing instant messages (IMs) destined for IM clients 102 are provided. An IM module is provided that receives the IM messages and may issue a challenge IM to the sender of the IM. The challenge IM requires a response in which a sender can send a response IM with an answer. If the answer satisfies an answer required for the challenge IM, the IM module may forward the originally sent IM to the IM client. Because spam is propagated by so-called spam bots (e.g., software programs, processes, or machines) that generate IM messages automatically, the bots most likely do not have the capability of responding to IMs with correct answers. Thus, when a challenge IM is issued for an IM received, typically a bot cannot respond to it (at least not likely with a correct answer). When a response is not received (or if the response does not contain the correct answer to the challenge), it may be determined that the received IM is spam. However, if it was a human user who actually sent the IM, the human user should be able to respond to the challenge IM with the correct answer. Thus, it may be determined that the IM is not spam, thereby directing it to be forwarded and delivered to the recipient.

Figure 5:
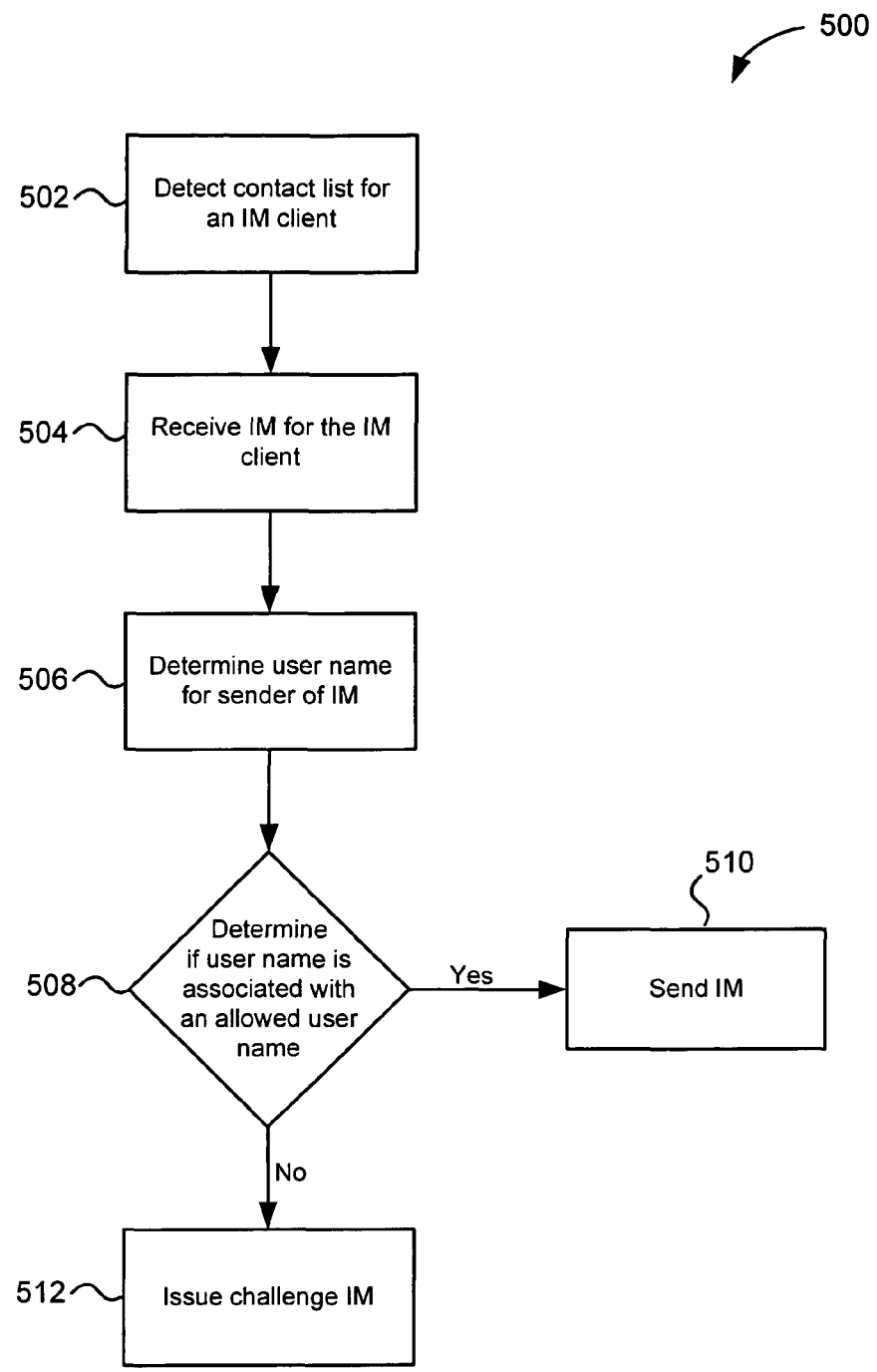
FIG. 5 depicts a simplified flowchart for processing IM messages according to one embodiment of the present invention.

FIG. 5 depicts a simplified flowchart 500 for processing IM messages according to one embodiment of the present invention. In step 502, IM module 106 detects a contact list for IM client 102. The contact list may be a buddy list or any other list of users that are authorized to contact the IM client 102. In one embodiment, the contact list is detected when a user logs on using an IM client. By logging on, a user may enter their IM screen name or any other user information to log onto an IM network. When a user logs onto an IM network, a contact list is sent to the provider of the IM network. IM module 106 detects this contact list and stores a copy of it.

In step 504, an IM for IM client 102 is received. Typically, an IM is sent to a username associated with the IM client. For example, a username may be "Alex". An IM may then be sent to that username "Alex" on the IM network.

In step 506, a username for a sender of the IM is determined. The username represents the sender's identity on the IM network, over which the communication is taking place. By the virtue of being situated between IM clients 102 and IM network 110, IM module 106 is able to determine the username IM network identity information) of IM clients 102 outside of the enterprise (and not just of IM clients 102 inside the enterprise). Hence, the IM username of the entity that sent the IM is known by IM module 106.

In step 508, it is determined if the username is associated with an allowed username. In one embodiment, the allowed username may be on a contact list for IM client 102. Also, in another embodiment, a larger contact list that includes other names not on the user's contact list may be used. For example, a corporate contact list or any other names that may be deemed safe may be added to the contact list. In one example, a global contact list including usernames for contact lists of all IM clients 102 used in a corporate network may be used as a contact list for the IM client 102.

In step 510, if the username is allowed, the IM may be sent. If the username is not allowed, in step 512, a challenge IM is issued. In one embodiment, the challenge IM is sent to the username of the sender of the IM. The challenge IM is used to determine if the IM message should be allowed and forwarded to a user. The challenge IM may ask a question that requires an answer. Alternatively, the challenge message may just require a response IM to be sent without any restrictions on its content (e.g., if no particular answer is required, but just something, such as "123", sent back).

In one embodiment, if a response to the challenge IM is not received, the IM is blocked. If an acceptable response to the challenge is received, then the IM message is forwarded to the IM client. Additionally, as will be described below, other actions may be taken.

Figure 6:
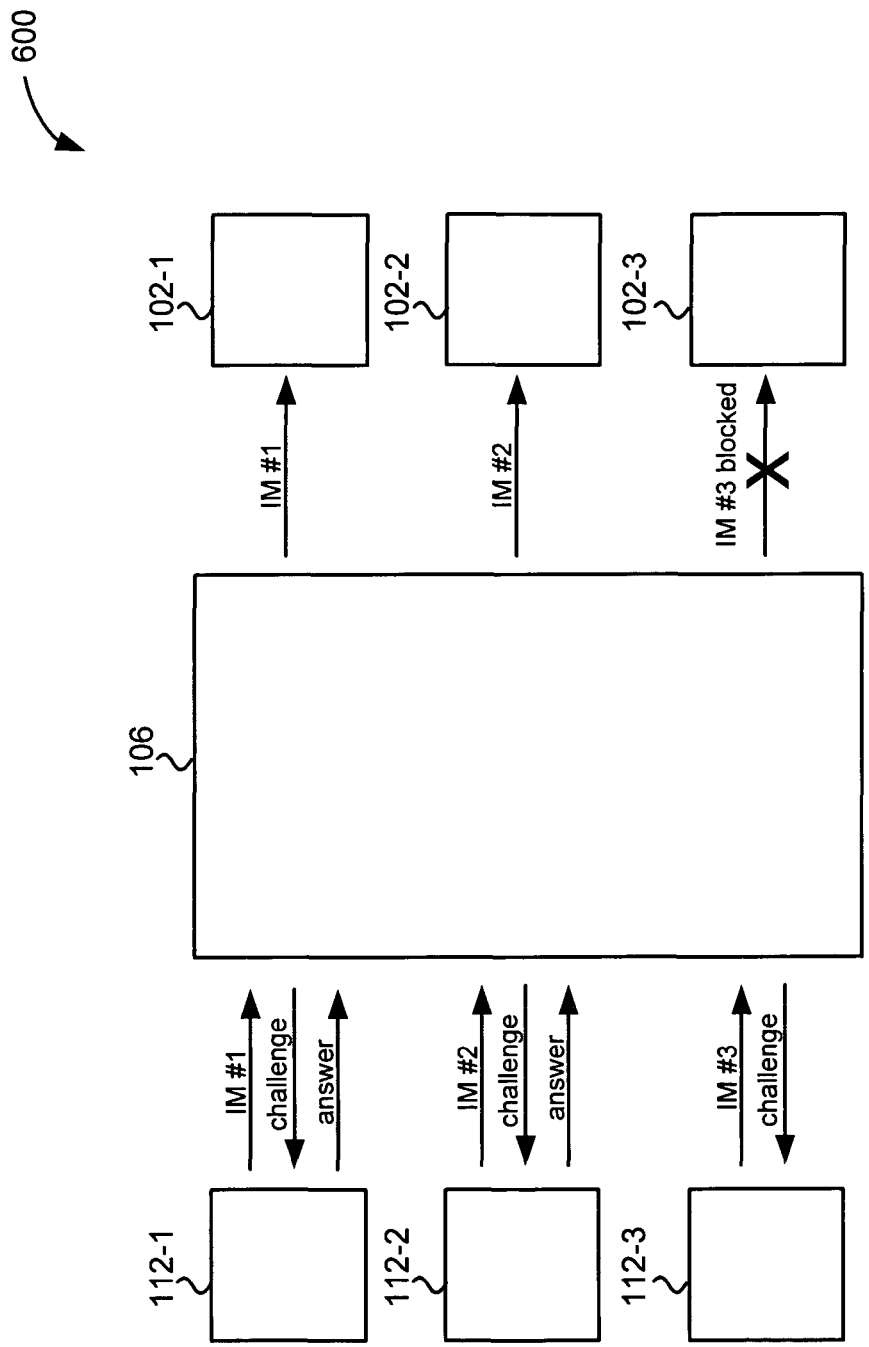
FIG. 6 depicts a system for processing IM messages according to one embodiment of the present invention.

FIG. 6 depicts a system 600 for processing IM messages according to one embodiment of the present invention. As shown, IM module 106 receives all IM messages sent by IM clients 112 for IM clients 102. As shown, three IMs are sent for three different IM clients 102. For each IM received, it is determined that a challenge message should be sent. Thus, the usernames from which the IMs were sent are not on a contact list associated with each destination IM client 102. As shown, challenge messages sent to IM clients 112-1 and 112-2 are received and an answer is sent to IM module 106. It is assumed that the answer is the correct answer to the challenge IM and thus IM #1 and IM #2 are forwarded to clients 102-1 and 102-2, respectively. However, in other situations, the answer may be the wrong answer and the IM may be blocked.

An answer is not received for the challenge message sent to IM client 112-3. Accordingly, IM #3 is blocked from being forwarded to client 102-3. In one embodiment, it is assumed that IM #3 is spam and thus should not be sent to IM client 102-3. Accordingly, IM client 102-3 does not receive a burdensome pop-up of a spam IM (or spim).

As shown in this example, IM module 106 manages all IMs sent to IM clients 102. For example, IM module 106 may manage all IM messages for a corporate network or entity. Thus, spam may be controlled for an entire network of IM clients 102.

Figure 7:
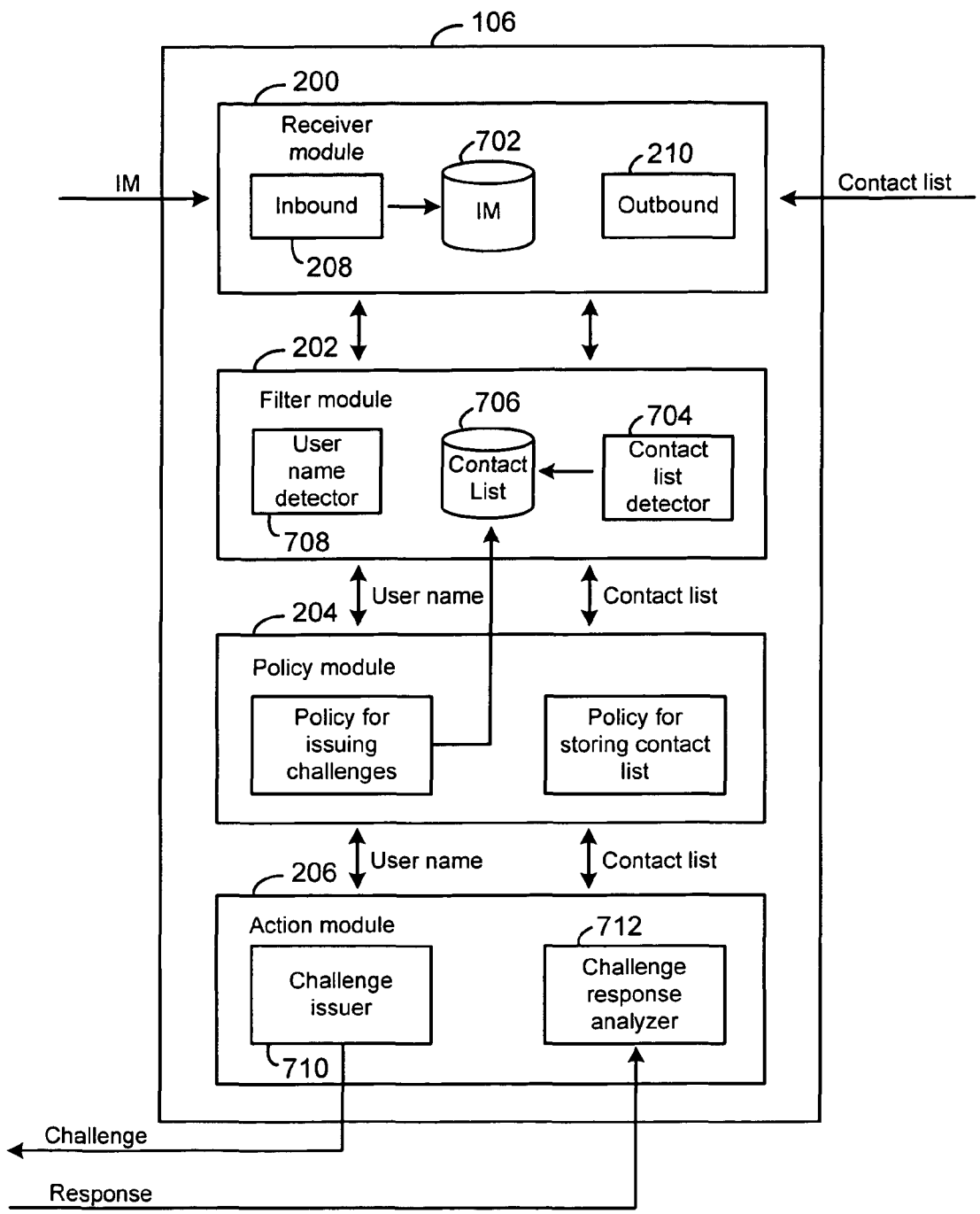
FIG. 7 depicts an embodiment of IM module according to embodiments of the present invention.

FIG. 7 depicts an embodiment of IM module 106 according to embodiments of the present invention. As shown, IM module 106 includes receiver module 200, filter module 202, policy module 204, and action module 206. These modules are included in other embodiments described previously, it will be understood that these modules may include the components described previously in addition to the components described herein.

Receiver module 200 includes an inbound IM processor 208 and an outbound IM processor 210. Also, a database 702 is used to store IM messages received. Outbound receiver 210 detects a contact list from an IM client 102 when a user logs on using an IM username. The contact list may be detected at other times though, such as when the buddy list is changed.

When the contact list is received, the policy for storing the contact list is reviewed. One policy for storing the contact list is to maintain the contact list for each user. Another policy for storing the contact list is to maintain the union of the contact lists of all users in the organization. A person skilled in the art can envision other policies. A contact list detector 704 determines that a contact list is received by outbound receiver 210 and stores the contact list in a contact list database 706. The contact list may then be used to determine if IM messages are from users in that contact list when they are received. In an embodiment, a contact list may not be detected every time a user logs on. Rather, a global contact list for an entire organization may be used.

An inbound message processor 208 receives an IM from IM client 112. The IM is stored in IM database 702, even if it is determined as spam (or spim) and not forwarded to an IM client 102. In one embodiment, an IM may be received from the IM client 102. In this case, the IM is from an IM client that is internal to the network. For example, the IM client may be situated in the same corporate network. IM module 106 may be configured to forward these IMs to the destination IM client 102 without checking whether or not the IM was spam (or spim).

When the IM is received, a username detector 708 detects the username associated with the IM message received. In one embodiment, a username detector 708 parses the IM protocol message to determine the username that sent the IM. The username is then sent to policy module 204.

Policy module 204 then uses a policy for issuing challenges to determine if a challenge message should be sent. Policy module 204 determines whether a challenge should be issued based on one or more policies. For example, a policy may be all usernames may be challenged except if the usernames fall within certain categories. For example, categories may be users who are on the contact list of the username being contacted, users who access IM networks through a specific IM module deployment, users who access IM networks through a federated IM module (i.e., several IM modules within the same business or among multiple businesses that have some sort of a trust relationship among them may be referred to as federated IM modules), users who are explicitly placed on a configurable contact list (or configurable contact lists) in IM Module 106, users who are explicitly given challenge/response keys (e.g., opted in software agents/bots that are considered legitimate or used by the organization), and the like.

Users who access IM networks through another IM module 106 (such as IM module deployed in a different organization or different deployment in the same organization) may not be challenged. In this case, it is assumed that an IM sent by an IM module 106 may not be spam. There may be many ways of detecting whether an IM has been sent by an IM module 106. For example, IM module 106 may be configured to insert a disclaimer into an IM and that disclaimer may be detected by policy module 204. Also, other signatures or information may be used to determine if the message was sent to an IM module 106.

Users who access IM networks through a federated IM module may be allowed. As mentioned above, a federated IM module 106 is defined as being one among a number of IM modules that have some sort of a trust relationship among them. Typically, these are IM modules 106 at the organization and its partner and/or customer organizations.

Users who are explicitly added to a configurable contact list (or configurable contact lists) in IM Module 106 may also be allowed. For example, friends of a corporation, opted in software agents/bots that are considered legitimate and/or useful by the organization may be included in a contact list in database 706. Thus, not all IM messages from bots may be challenged if they are deemed useful or allowable.

Users who are explicitly given challenge/response keys (e.g., opted in software agents/bots that are considered legitimate or used by the organization) may be allowed. These users may be given a key that may be inserted into an IM message that is detected by policy module 204. Thus, IM messages sent by these users are not issued challenges and are sent to IM clients 102.

The above configurations are not exhaustive and a person skilled in the art will appreciate other variations. Additionally, any number of policies may be used in determining if a challenge should be issued.

The contact list found in IM database 706 is also dynamic. For example, configuration changes may take place in real-time. If one or more of the above conditions changes, the changes are updated to contact list in database 706. For example, if one or more IM usernames are removed or added to an IM contact list for an IM client in the IM network, those changes are detected and realized in a contact list in IM module 106 as well as in database 706, if needed.

If a policy for issuing a challenge is satisfied, action module 206 is sent the username and a challenge issuer 710 is configured to issue a challenge. In one embodiment, challenge issuer 710 may determine the format of the challenge to be sent based on the destination IM client 102, the sender of IM, or any other factors. Additionally, a pre-set challenge IM may be configured for all IM messages received. One challenge format is plain text, wherein a question would be formulated (e.g., "please type 'facetime' on a line by itself"). More advanced formats, such as IMs that include images or links are also possible.

After the challenge IM is issued, a response IM may be received from the IM client that received the challenge IM at a challenge response analyzer 712. Also, a response to the challenge IM may not be received. For example, a bot may not know how to respond to a challenge IM sent to it.

If a response IM is sent, challenge response analyzer 712 reviews the response and determines if the response IM satisfies an answer that is expected from the response. In one embodiment, receiving a response IM for the challenge IM may be sufficient to allow the initial IM sent to be forwarded to its destination (intended recipient). Or, a question may have been asked, to which an answer may be required. For example, a personal question related to the destination username may be sent. Also, the message may ask a user to type in a word or phrase that is shown on the screen. The response IM is then analyzed to determine if the response IM has the correct answer required.

If a response is not received or the answer to the response IM is not correct, the initial IM received is blocked. A time limit may be set for receiving a response message. For example, if response message is not sent in ten seconds, the IM is blocked. In addition, the maximum number of wrong answers allowed may be set, beyond which the challenged IM username is blocked for a significant period of time. Other response processing policies are also possible.

Figure 8:
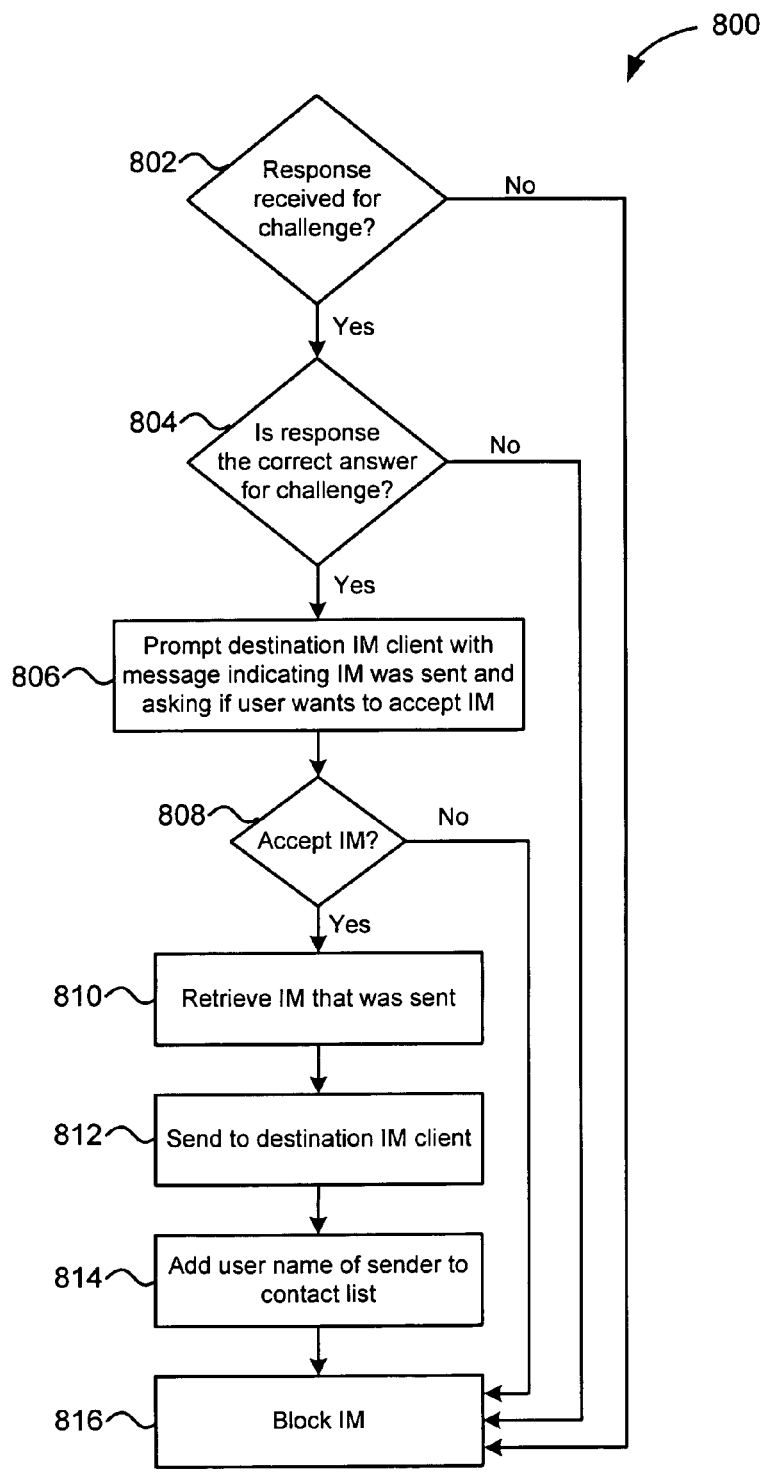
FIG. 8 depicts a simplified flowchart of a method for processing responses to challenge IMs according to one embodiment of the present invention.

FIG. 8 depicts a simplified flowchart 800 of a method for processing responses to challenge IMs according to one embodiment of the present invention. The method assumes that an IM has been received for a destination IM client or a challenge IM has been sent to the sender. In step 802, it is determined if a response IM is received for the challenge IM. If a response IM is not received, the method proceeds to step 816 where the IM is blocked. In one embodiment, there may be a time limit where if a response is not received within that time limit, it is determined that a response is not received and the IM is blocked in step 816. In another embodiment, there may be a limit set on the number of wrong answers allowed. Exceeding this limit would cause the challenged IM username to be blocked for a significant period of time. Other response processing policies are also possible.

If a response is received, in step 804, it is determined whether or not the response contains the correct answer for the challenge. For example, the message may ask a user to type in a word or phrase that is shown on the screen. In another embodiment, a challenge may be an image containing a handwritten word that needs to be replicated in the response. These challenges are easily answered by human IM users, but pose significant difficulty to the automatic spam (or spim) agents/bots. This is because a human user can easily see the word and replicate it in a response IM. Typically, software agents/bots cannot recognize the word and hence cannot send the correct response (even if the bots are able send any response at all). Additionally, just receiving a response (e.g., any text message) may be considered sufficient and be construed as the correct answer for the challenge message. If the response is not the correct answer, the method proceeds to step 814, where the IM is blocked.

If the correct answer is received for the challenge IM, in step 806, the destination IM client is prompted with a message indicating that an IM was sent from a username and asking if the user wants to accept the IM. For example, a message may be "An IM has been received from a user "Alex", the user has satisfied the challenge, do you want to accept the IM?" In one embodiment, this step may be skipped and the IM message may be automatically forwarded to the IM client. However, since the IM that was sent from a username that was not on the user's contact list and thus may not be known by the user, the user is given the option to reject the IM.

In step 808, it is determined if the destination IM client 102 accepted the IM. If it is not accepted, in step 816, the IM is blocked.

If the IM is accepted, in step 810, the original IM that was sent is retrieved from the computer memory (or possibly from database 702, or any other storage area) for the purposes of forwarding it to its intended destination recipient. Because the challenge IM was issued, the original IM was not immediately forwarded to its intended destination recipient in the anticipation of the response to the challenge and the need to determine whether or not the response is correct. Since IM module 106 is capable of storing received IMs, it can monitor the potentially spam (or spim) traffic and provide the means to display (e.g., by the means of convenient Web-based reports) unsuccessful responses to challenges for a subsequent review by authorized personnel.

In step 812, the IM is forwarded to the destination IM client 102. Accordingly, in one embodiment, the IM is not sent in real-time, but rather stored for a moment inside IM module 106, while IM module 106 communicates with the sender of the IM message.

In step 814, the username of the sender may be added to a contact list of the destination IM client 102 or a global contact list of the organization and its partners and/or customers. This action may not be taken in some embodiments. For example, the affirmative addition of the username by a user of IM client 102 itself may be necessary. Thus, the user permits the sender to be on their contact list and manually adds them. However, IM module 106 may determine that since the user accepted this IM, other IMs from the sender should be directly forwarded to the user's IM client 102.

In one embodiment, a user may attempt to add a contact to his/her buddy list. A signal for adding the contact to the buddy list is intercepted by IM module 104. IM module 104 may not allow the immediate addition of the contact to the user's buddy list. In one embodiment, IM module 104 may perform an action, such as sending a message like a challenge message that requires additional input from the user. For example, a link may be sent to the user's IM client 102. The link, when selected, may present a form that needs to be filled out by the user in order to get approval for adding the contact to the user's buddy list. When the form is filled out, it may be sent to IM module 104, which may then route the form to an entity designed to approve buddy requests. The entity may then decide whether to approve or deny the buddy request. If the buddy request is approved, the user is able to add the contact to the user's buddy list.

If a user continues to try and add the contact before receiving approval, IM module 104 may intercept the requests and not allow the addition until approval is received. A message may also be sent to the user's IM client 102 indicating that the approval is being processed. Once the approval is given, IM module 102 may determine when the user is logged in to an IM client 102 and send an IM that the buddy request has been approved and the contact can be added. Similarly, if the request is denied, a denial IM may be sent with the reasons for denial.

The contacts that can be subject to the approval process may be contacts in an enterprise network or outside of the enterprise network. The above process allows the interception of buddy list events and actions are performed related to the buddy list events.

The approval entity may communicate with IM module 102 using any methods. For example, application programming interfaces (APIs) may be used to communicate with the approval entity.

Accordingly, methods and apparatus for processing IM messages are provided. The methods and apparatus may be used to prevent spam or unauthorized messages that are sent to IM clients. For example, challenges are issued that need to be responded to in order for the IM message to be forwarded to the IM client. The challenge messages may be issued in certain circumstances if, for example, a username of the sender is not on a contact list of the intended recipient (or contact lists of the others inside the organization). Because a response to a challenge message is required, automated software agents/bots typically have trouble responding to the challenge messages. Thus, messages from these automated software agents/bots may be prevented by issuing the challenges. Policies are included in a central IM module that detect contact lists for IM clients and determine when to send challenge messages.

Also, by having an IM module 106 that can receive and filter IM messages from different IM networks, a solution for all IM clients of a corporate network may be provided by IM module 106. Also, because the IM module is configured to process IMs from different network providers, spam in different network formats may be prevented using challenges.

While the present invention has been described using a particular combination of hardware and software, it should be recognized that other combinations of hardware and software are also within the scope of the present invention. The control logic may also be stored on an information storage medium as instructions configured to be executed by an information processing device. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for processing instant messages (IMs) within a communications network, the method comprising:

receiving, at a computer system coupled to the communications network, a plurality of policies for each instant messaging (IM) network in a plurality of different IM networks supported by the computer system, wherein each of the plurality of different IM networks includes a different IM network protocol;

storing the plurality of policies for each IM network in the plurality of different IM networks supported by the computer system in a policy database associated with the computer system, at least one stored policy in the policy database corresponding to a first type of policy for taking actions on the IMs destined for the plurality of IM clients and at least one stored policy in the policy database corresponding to a second type of policy for issuing challenge IMs to senders of IMs communicated via the communications network, each of the first type of policies stored in the policy database including information defining:

a set of characteristics pertaining to at least one IM network protocol in the plurality of IM network protocols or content of one or more IMs in the at least one IM network protocol in the plurality of IM network protocols, and an action to be performed when one or more characteristics of IMs in the at least one IM network protocol in the plurality of IM network protocols or content of IMs in the at least one IM network protocol in the plurality of IM network protocols satisfy the set of characteristics defined in the policy;

wherein each of the second type of policies for issuing challenge IMs determines if a challenge IM should be sent in response to a received IM;

receiving, at the computer system, a first IM from a first IM network in the plurality of IM networks using a first IM network protocol in the plurality of different IM network protocols supported by the computer system corresponding to the first IM network, the first IM destined for an IM client associated with the communications network that communicates with at least the first IM network using the first IM network protocol;

filtering, by one of a plurality of different filters associated with the computer system and corresponding to a specific IM network of the plurality of different IM networks, the first IM into a predetermined format specific internally to the computer system and different from the first IM network protocol of the first IM to generate a filtered IM, wherein each of said plurality of different filters are distinct and are used for filtering IMs received from their respective one of the plurality of different IM network, wherein filtering is by filtering the first network protocol of the received IM and converting the received IM into the predetermined format, wherein the predetermined format is a generic format;

determining, with the processor associated with the computer system, whether a challenge IM should be sent via one or more of the plurality of different IM networks to a sender of the first IM in response to retrieving from the policy database at least one policy for issuing challenge IMs based on one or more characteristics pertaining to the first IM network protocol of the first IM as represented by the filtered IM or to content of the first IM as represented by the filtered IM;

if a challenge IM should be sent, sending the challenge IM to the sender of the first IM via one of the plurality of different IM networks using one of the plurality of different IM network protocols, the challenge IM requiring based on the at least one policy a response IM from the sender;

if a response IM to the challenge IM is received at the computer system via the one of the plurality of different IM networks, filtering using the processor associated with the computer system the response IM into the predetermined format specific internally to the computer system to generate a filtered response IM;

determining, with the processor associated with the computer system, whether the filtered response IM satisfies an answer required by the challenge IM; and communicating, using the computer system, a second IM to the IM client if the filtered response IM satisfies the answer required by the challenge IM.

2. The method of claim 1, further comprising:

sending, using the processor associated with the computer system, at least one IM to the IM client indicating that the first IM was sent from an entity, the at least one IM prompting the IM client to accept or reject the first IM.

3. The method of claim 1, further comprising:

receiving, at the computer system, a contact list for the IM client in response to a user logging on to the first IM network with the IM client;

determining, with the processor associated with the computer system, a contact identifier for an entity associated with the first IM;

determining, with the processor associated with the computer system, whether the first IM is an allowable IM in response to comparing the contact identifier with the contact list for the IM client; and wherein determining whether a challenge IM should be sent to the sender of the first IM takes into account whether the first IM is an allowable IM.

4. The method of claim 1, wherein determining using the processor associated with the computer system whether the filtered response IM satisfies the answer required by the challenge IM comprises comparing, with the processor associated with the computer system, a response in the filtered response IM to the answer to determine whether the response matches the answer.

5. The method of claim 1, further comprising:
if no response IM to the challenge IM is received, blocking the first IM using the computer system according to the policy, wherein the IM client does not receive the first IM.

6. The method of claim 1, further comprising:
if the response IM to the challenge IM does not satisfy the answer required, blocking the first IM using the computer system according to the at least one policy, wherein the IM client does not receive the first IM.

7. A method for managing instant messages (IMs) within a communications network from entities, the method comprising:
receiving, at a computer system coupled to the communications network, a plurality of policies for each instant messaging (IM) network in a plurality of different IM networks supported by the computer system, wherein each of the plurality of different IM networks includes a different IM network protocol;
storing the plurality of policies for each IM network in the plurality of different IM networks supported by the computer system in a policy database associated with the computer system, at least one stored policy in the policy database corresponding to a first type of policy for taking actions on the IMs destined for the one or more IM clients and at least one stored policy in the policy database corresponding to a second type of policy for issuing challenge IMs to senders of IMs communicated via the communications network, each of the first type of policies stored in the policy database including information defining:
a set of characteristics pertaining to at least one IM network protocol in the plurality of IM network protocols or content of one or more IMs in the at least one IM network protocol in the plurality of IM network protocols, and
an action to be performed when one or more characteristics of IMs in the at least one IM network protocol in the plurality of IM network protocols or content of IMs in the at least one IM network protocol in the plurality of IM network protocols satisfy the set of characteristics defined in the policy;
wherein each of the second type of policies for issuing challenge IMs determines if a challenge IM should be sent in response to a received IM;
receiving, at the computer system, a contact list for each of the one or more IM clients, the contact list including a list of contact identifiers;
receiving, at the computer system, a first IM from a first IM network in the plurality of IM networks using a first IM network protocol in the plurality of different IM network protocols supported by the computer system, the first IM destined for an IM client corresponding to the first IM network that communicates with the first IM network using the first IM network protocol;
filtering, by one of a plurality of different filters associated with the computer system and corresponding to a specific IM network of the plurality of different IM networks, the first IM into a predetermined format specific internally to the computer system and different from the first IM protocol of the first IM to generate a filtered IM, wherein each of said plurality of different filters are distinct and are used for filtering IMs received from their respective one of the plurality of different IM network, wherein filtering is by filtering the first network protocol of the received IM and converting the received IM into the predetermined format, wherein the predetermined format is a generic format;
determining, with a processor associated with the computer system, a contact identifier for the filtered IM;
determining, with a processor associated with the computer system, a contact list for the first IM client from the contacts lists received for each of the one or more IM clients;
determining, with the processor associated with the computer system, whether the determined contact identifier for the filtered IM matches a contact identifier in the determined contact list for the IM client;
if the determined contact identifier for the filtered IM does not match a contact identifier in the determined contact list for the IM client, determining whether a challenge IM should be sent via one of the plurality of different IM networks to an entity that sent the first IM in response to retrieving from the policy database at least one policy for issuing challenge IMs based on one or more characteristics pertaining to the first IM network protocol of the first IM as represented by the filtered IM or to content of the first IM as represented by the filtered IM;
if a challenge IM should be sent, sending using the computer system the challenge IM to an entity that sent the first IM via one of the plurality of different IM networks using one of the plurality of different IM network protocols, the challenge IM requiring based on the at least one policy a response IM from the entity; and
if the determined contact identifier for the filtered IM does match a contact identifier in the determined contact list for the IM client, communicating using the computer system a second IM to the IM client if a filtered response IM generated based on at least one response IM from the client satisfies an answer required by the challenge IM.

8. The method of claim 7, further comprising:
receiving, at the computer system, a response IM for the challenge IM;
filtering, with the processor associated with the computer system, the response IM into the predetermined format specific internally to the computer system to generate a filtered response IM; and
determining, with the processor associated with the computer system, whether the filtered response IM satisfies an answer required by the challenge IM.

9. The method of claim 8, further comprising:
sending, using the processor associated with the computer system, at least one IM to the IM client indicating that the first IM was sent from the entity, the at least one IM prompting the IM client to accept or reject the first IM.

10. The method of claim 8, wherein determining, with the processor associated with the computer system, whether the filtered response IM satisfies the answer required by the challenge IM comprises comparing, with the processor associated with the computer system, a response in the filtered response IM to the answer to determine whether the response matches the answer.

11. The method of claim 7, further comprising:
if no response IM to the challenge IM is received, blocking the first IM using the computer system, wherein the IM client does not receive the first IM.

12. The method of claim 7, further comprising:
if the response IM to the challenge IM does not satisfy the answer required, blocking the first IM using the computer system, wherein the IM client does not receive the first IM.

13. An apparatus for managing instant messages (IMs) within a communications network from entities, the apparatus comprising:
a policy database configured to store a plurality of policies for each instant messaging (IM) network in a plurality of different IM networks, wherein each of the plurality of different IM networks includes a different IM network protocol, at least one stored policy in the policy database corresponding to a first type of policy for taking actions on the IMs destined for the one or more of IM clients and at least one stored policy in the policy database corresponding to a second type of policy for issuing challenge IMs to senders of IMs communicated via the communications network, each stored policy including information defining:
 a set of characteristics pertaining to at least one IM network protocol in the plurality of IM network protocols or content of one or more IMs in the at least one IM network protocol in the plurality of IM network protocols, and
 an action to be performed when one or more characteristics of IMs in the at least one IM network protocol in the plurality of IM network protocols or content of IMs in the at least one IM network protocol in the plurality of IM network protocols satisfy the set of characteristics defined in the policy;
wherein each of the second type of policies for issuing challenge IMs determines if a challenge IM should be sent in response to a received IM;
a communications interface coupled to the communications network and configured to receive IMs associated with the plurality of different IM;
a memory configured to store a set of code modules; and
a processor configured to execute the set of code modules, the set of code modules including:
 a plurality of IM network modules configured to provide substantially real-time IM communications to the one or more IM clients and the plurality of different IM networks;
 a filter module configured to:
  filter, by one of a plurality of different filters corresponding to a specific IM network of the plurality of different IM networks, IMs obtained from each of the plurality of different IM network modules into a predetermined internal format that is different from formats of the plurality of IM networks to generated filtered IMs, wherein each of said plurality of different filters are distinct and are used for filtering IMs received from their respective one of the plurality of different IM network, wherein filtering is by filtering the network protocol of any received IM and converting the received IM into the predetermined format, wherein the predetermined format is a generic format
 a challenge module configured to:
  determine whether a challenge IM should be sent via one or more of the plurality of different IM networks to a sender of a first IM received from a first IM network in the plurality of IM networks using a first IM network protocol in response to retrieving from the policy database at least one policy for issuing challenge IMs based on one or more characteristics pertaining to the first IM network protocol of the first IM as represented by a filtered IM generated by the filter module or to content of the first IM as represented by a filtered IM generated by the filter module, the first IM destined for a first destination client configured to communicate with the first IM network using the first IM network protocol, and
  if a challenge IM should be sent, send a challenge IM to the sender of the first IM via one of the plurality of different IM networks using one of the plurality of different IM network protocols, the challenge IM generated by the filter module requiring based on the at least one policy a response IM from the sender;
 a challenge response module configured to determine whether a response IM to the challenge IM satisfies an answer required by the challenge IM based on a filtered response IM generated by the filter module from the response IM; and
 a message forwarder module configured to forward at least one IM generated by the filter module according to the first IM network protocol based on a determination made by the challenge response module.

14. The apparatus of claim 13, further comprising:
a contact list detector module configured to detect one or more contact lists for one or more IM destination clients in response to users logging on to IM networks with the one or more IM destination client;
wherein the challenge module is configured to determine if a challenge IM should be sent based on whether or not an identifier for a sender of the first IM is on the one or more contact lists.

15. The apparatus of claim 14, wherein the challenge module is configured to not issue a challenge IM if the identifier is on one or more contact lists.

16. The apparatus of claim 13, further comprising:
the message forwarder module configured to forward the at least one IM if the response IM satisfies the answer required.

17. The apparatus of claim 16, wherein the message forwarder is configured to, if the response IM satisfies the answer, send another IM generated by the filter module according to the first IM network protocol in response to filtering one or more portions of a filtered IM into the another IM indicating that the first IM was sent from the entity, the another IM prompting the first destination client to accept or reject the first IM.

18. The apparatus of claim 13, further comprising:
a database configured to store the first IM, wherein if the response IM satisfies the answer required, the first IM is retrieved from the database for forwarding to the first destination client.

19. The apparatus of claim 13, wherein the communications interface is configured to receive all IMs destined for one or more IM destination clients in response to events generated by another computer system.

20. A non-transitory computer-readable storage medium storing a plurality of instructions configured to direct an information processing device for processing instant messages (IMs) within a communications network from entities, the computer-readable storage medium comprising:
instructions for receiving a plurality of policies for each instant messaging (IM) network in a plurality of different IM networks, wherein each of the plurality of different IM networks includes a different IM network protocol;

instructions for storing the plurality of policies for each IM network in the plurality of IM networks in a policy database, at least one stored policy in the policy database corresponding to a first type of policy for taking actions on the IMs destined for the one or more of the plurality of IM clients and at least one stored policy in the policy database corresponding to a second type of policy for issuing challenge IMs to senders of IMs communicated via the communications network, each stored policy including information defining:
  a set of characteristics pertaining to at least one IM network protocol in the plurality of IM network protocols or content of one or more IMs in the at least one IM network protocol in the plurality of IM network protocols, and
  an action to be performed when one or more characteristics of IMs in the at least one IM network protocol in the plurality of IM network protocols or content of IMs in the at least one IM network protocol in the plurality of IM network protocols satisfy the set of characteristics defined in the policy;
wherein each of the second type of policies for issuing challenge IMs determines if a challenge IM should be sent in response to a received IM;
instructions for receiving a first IM from a first IM network in the plurality of IM networks using a first IM network protocol in the plurality of IM network protocols corresponding to the first IM network, the first IM destined for an IM client that communicates with the first IM network using the first IM network protocol;
instructions for filtering, by one of a plurality of different filters corresponding to a specific IM network of the plurality of different IM networks, the first IM into a predetermined internal format different from the first IM protocol of the first IM to generate a filtered IM, wherein each of said plurality of different filters are distinct and are used for filtering IMs received from their respective one of the plurality of different IM network, wherein filtering is by filtering the first network protocol of the received IM and converting the received IM into the predetermined format, wherein the predetermined format is a generic format;
instructions for determining whether a challenge IM should be sent to a sender of the first IM in response to retrieving from the policy database at least one policy for issuing challenge IMs based on one or more characteristics pertaining to the first IM network protocol of the first IM as represented by the filtered IM or to content of the first IM as represented by the filtered IM;
instructions for, if a challenge IM should be sent, sending the challenge IM to the sender of the first IM via one of the plurality of different IM networks using one of the plurality of different IM network protocols, the challenge IM requiring based on the at least one policy a response from the sender;
instructions for, if a response IM to the challenge IM is received via the one of the plurality of different IM networks, filtering the response IM into the predetermined format specific internally to the computer system to generate a filtered response IM;
instructions for determining whether the filtered response IM satisfies an answer required by the challenge IM; and
instructions for communicating a second IM to the IM client if the filtered response IM satisfies the answer required by the challenge IM.

21. The non-transitory computer-readable storage medium of claim 20, further comprising:
  instructions for sending at least one IM to the IM client indicating that the first IM was sent from an entity, the at least one IM prompting the IM client to accept or reject the first IM.

22. The non-transitory computer-readable storage medium of claim 20, further comprising:
  instructions for detecting a contact list for the IM client in response to a user logging on to the first IM network with the IM client;
  instructions for determining a contact identifier for an entity associated with the first IM;
  instructions for determining whether the first IM is an allowable IM in response to comparing the contact identifier with the contact list for the IM client; and
  wherein the instructions for determining whether a challenge IM should be sent to the sender of the first IM takes into account whether the first IM is an allowable IM.

23. The non-transitory computer-readable storage medium of claim 20, wherein the instructions for determining whether the filtered response IM satisfies the answer comprises instructions for comparing a response to the answer to determine if the response matches the answer.

24. The non-transitory computer-readable storage medium of claim 20, further comprising:
  instructions for, if no response IM to the challenge IM is received, blocking the first IM, wherein the IM client does not receive the first IM.

25. The non-transitory computer-readable storage medium of claim 20, further comprising:
  instructions for, if the response IM to the challenge IM does not satisfy the answer required, blocking the first IM, wherein the IM client does not receive the first IM.

26. A non-transitory computer-readable storage medium storing a plurality of instructions configured to direct an information processing device for managing instant messages (IMs) within a communications network from entities, the computer-readable storage medium comprising:
  instructions for receiving a plurality of policies for each instant messaging (IM) network protocol in a plurality of different IM network, wherein each of the plurality of different IM networks includes a different IM network protocol;
  instructions for storing the plurality of policies for each IM network in the plurality of IM networks in a policy database, at least one stored policy in the policy database corresponding to a first type of policy for taking actions on the IMs destined for the one or more IM clients and at least one stored policy in the policy database corresponding to a second type of policy for issuing challenge IMs to senders of IMs communicated via the communications network, each stored policy including information defining:
    a set of characteristics pertaining to at least one IM network protocol in the plurality of IM network protocols or content of one or more IMs in the at least one IM network protocol in the plurality of IM network protocols, and
    an action to be performed when one or more characteristics of IMs in the at least one IM network protocol in the plurality of IM network protocols or content of IMs in the at least one IM network protocol in the plurality of IM network protocols satisfy the set of characteristics defined in the policy;

wherein each of the second type of policies for issuing challenge IMs determines if a challenge IM should be sent in response to a received IM;

instructions for receiving a contact list for the one or more IM clients, the contact list including a list of contact identifiers;

instructions for receiving a first IM from a first IM network in the plurality of IM networks using a first IM network protocol in the plurality of IM network protocols, the first IM destined for an IM client corresponding to the first IM network configured to communicate with the first IM networks using the first IM network protocol;

instructions for filtering, by one of a plurality of different filters corresponding to a specific IM network of the plurality of different IM networks, the first IM into a predetermined internal format that is different from the first IM protocol of the first IM to generate a filtered IM, wherein each of said plurality of different filters are distinct and are used for filtering IMs received from their respective one of the plurality of different IM network, wherein filtering is by filtering the first network protocol of the received IM and converting the received IM into the predetermined format, wherein the predetermined format is a generic format;

instructions for determining a contact identifier for the filtered IM;

instructions for determining a contact list for the IM client, the contact list including one or more contact identifiers that may be associated with IMs;

instructions for determining whether the determined contact identifier for the filtered IM matches a contact identifier in the determined contact list for the IM client;

instructions for, if the determined contact identifier for the filtered IM does not match a contact identifier in the determined contact list for the IM client, determining whether a challenge IM should be sent via one of the plurality of IM networks to an entity that sent the first IM in response to retrieving from the policy database at least one policy for issuing challenge IMs based on one or more characteristics pertaining to the first IM network protocol of the first IM as represented by the filtered IM or to content of the first IM as represented by the filtered IM;

instructions for, if a challenge IM should be sent, sending the challenge IM to an entity that sent the first IM via one of the plurality of IM networks using one of the plurality of different IM network protocols, the challenge IM requiring based on the at least one policy a response from the entity; and instructions for, if the determined contact identifier for the filtered IM does match contact identifier in the determined contact list for the IM client, communicating a second IM to the IM client if a filtered response IM generated based on at least one response IM from the client satisfies an answer required by the challenge IM.

27. The non-transitory computer-readable storage medium of claim 26, further comprising:

instructions for receiving a response IM for the challenge IM;

instructions for filtering the response IM into the predetermined format to generate a filtered response IM; and instructions for determining whether the filtered response IM satisfies an answer required by the challenge IM.

28. The non-transitory computer-readable storage medium of claim 27, further comprising:

instructions for, if the filtered response IM satisfies the answer, sending at least one IM to the IM client indicating that the first IM was sent from the entity, the at least one IM prompting the IM client to accept or reject the first IM.

29. The non-transitory computer-readable storage medium of claim 27, wherein the instructions for determining whether the filtered response IM satisfies the answer required by the challenge IM comprises instructions for comparing a response in the filtered response IM to the answer to determine whether the response matches the answer.

30. The non-transitory computer-readable storage medium of claim 26, further comprising:

instructions for, if no response IM to the challenge IM is received, blocking the first IM, wherein the client does not receive the first IM.

31. The non-transitory computer-readable storage medium of claim 26, further comprising:

instructions for, if the filtered response IM to the challenge IM does not satisfy the answer required, blocking the first IM, wherein the IM client does not receive the first IM.

* * * * *